United States Patent Office 3,069,409
Patented Dec. 18, 1962

3,069,409
PROCESS OF PREPARING CARBOXYALKYL CELLULOSE ETHERS
John E. Henry, Harbor Beach, and George A. Reasor, Wayne, Mich., assignors to Hercules Powder Company, Wilmington, Del., a corporation of Delaware
No Drawing. Filed June 12, 1958, Ser. No. 741,452
8 Claims. (Cl. 260—231)

This invention relates to an improved process of preparing carboxyalkyl cellulose ethers and, more particularly, to such a process wherein improved conditions are employed to give uniform and effective etherification of cellulose and consequently an alkali-soluble and water-soluble cellulose ether of good quality.

Ethers of this type, e.g. carboxymethylcellulose, usually are made by reacting cellulose with a carboxyalkyl etherifying agent, such as a halogenated lower fatty acid or salt thereof, in the presence of caustic alkali and water. As soon as the reaction has advanced enough so that the cellulose ether being formed has a substitution in excess of about 0.4, it dissolves in the aqueous alkali and coagulates into a viscous dough which is diffcult to process both in completing the etherification and in purifying the cellulose ether product. Degree of substitution (D.S.) used herein means the average number of hydroxyl groups present per anhydroglucose unit of cellulose which have been substituted by ether groups, three being complete substitution of the cellulose.

In this art, it has been known for a long time that uniform substitution of cellulose has a great beneficial effect not only in increasing the efficiency of the etherification reaction but also on the quality of the resulting ethers. Likewise, it has long been known in this art that uniform distribution of the alkali and water on the cellulose prior to etherification is vitally important to the efficiency of etherification and the quality of the cellulose ethers thus produced. The degree of substitution, of course, is directly proportional to the quantity of etherifying agent consumed throughout the etherifying reaction. Thus on the extent of uniformity of substitution depends whether the percent yield of cellulose ether based on etherifying agent is high or low and whether the cellulose ether dissolves to give clear solutions or contains unreacted fibers and forms turbid solutions.

In view of the importance of the foregoing, several methods have been proposed in an effort to accomplish the desired result, and some of these methods have been considered of sufficient merit to place in operation. However, great difficulties have been encountered and, insofar as known, all prior art processes leave something to be desired, either better economy or better quality of product or both. Prior art methods involving steeping and pressing procedure for the preparation of alkali cellulose have been uneconomical because the alkali cellulose prepared in this way retains far more caustic alkali and water than is required for the desired etherification. Various dough-mixing and dry-mixing procedures have been proposed to overcome the inherent shortcomings of steeping processes. These have not given uniformity to the desired extent because the small amounts of caustic alkali and water required for economically preparing alkali-soluble and water-soluble cellulose ethers cannot be uniformly distributed on the cellulose by such mixing procedures.

While slurry processes heretofore proposed have many desirable features, and the slurry principle is being successfully used on a commercial scale today, they are not entirely satisfactory. The slurry process disclosed and claimed in Klug and Tinsley U.S. Patent 2,517,577 is limited to the use of isopropyl alcohol and tertiary butyl alcohol as diluents. As this patent discloses, the patentees found that very poor results in both etherification efficiency and maximum extent of D.S. are obtained with n-propyl alcohol, isobutyl alcohol, secondary-butyl alcohol, dioxane, n-butyl alcohol, and acetone; whereas using the same conditions as for the above diluents, excellent results are obtained with isopropyl alcohol and tertiary butyl alcohol. It is desirable to have far more flexibility in the choice of diluents from the standpoint of diluent losses during the process, cost, efficiency of recovery, and so forth.

An object of this invention is an improved process of preparing carboxyalkyl cellulose ethers. A further object of this invention is such a process characterized by high efficiency and economy of operation. A still further object is such a process wherein diluents are quite satisfactory which were thought to be inoperable in prior art processes. These and other objects will be apparent from the description of this invention given hereinafter.

The above and other objects are accomplished according to this invention by employing what applicant has found to be critical process conditions. Thus, it has been found according to the present process that diluents which heretofore were unsatisfactory now give very good results providing the proper ratio of water to cellulose is employed, that this ratio range is critical and also that it varies depending on the diluent involved.

The following examples illustrate specific and preferred ways of practicing the present invention; however, the invention is not to be limited to these specific embodiments. Unless otherwise indicated, in the examples and elsewhere herein, parts and percent are by weight and cellulose is on an air-dry basis. Conversion efficiency is the percentage of the monochloroacetic acid (MCA) charged, which is consumed in producing carboxymethyl groups. For example, if one mole of MCA is consumed per anhydroglucose unit of cellulose and a D.S. of 1.0 is obtained, then the MCA conversion efficiency is 100%. Conversion efficiency is based on bone-dry cellulose.

In analyzing the following examples it should be kept in mind that solution properties, MCA efficiency and D.S. are all important factors, and also that fiber rating is a more sensitive and therefore more precise measuring means than turbidity. Fiber rating is based on an arbitrary set of standards well known in this art. The scale for fibers is as follows, the solution quality becoming better as the fiber rating number decreases.

| Solution Quality: | Fiber rating |
| --- | --- |
| Worst | Opaque |
| Better | 5+ |
| Better | 5 |
| Better | 4 |
| Better | 3 |
| Best | 2 |

In these examples the preparation of carboxymethylcellulose was chosen because it is quite typical of the carboxyalkyl cellulose ethers.

EXAMPLES 1A–8C—TABLE 1

In each of these examples the indicated amounts of diluent, caustic and water were mixed. The specified amount of air-dried comminuted cellulose was added to the resulting mixture to form a slurry of the cellulose therein. After an alkali-cellulose period (45–60 minutes at 20° C.–30° C.), monochloroacetic acid (MCA) was added to the slurry. The temperature of the reaction mixture thus prepared was brought to a reaction temperature of 70° C. during a period of approximately 30 minutes, and then held at this temperature for 90 minutes. The one exception is that acetone was heated at 50° C. for 4 hours. Agitation was employed throughout the mixing and the reaction. The resulting cellulose ether product at this stage of the process was fibrous and similar in appearance to the starting cellulose. After draining the liquid from the product, it was suspended in methanol of 70% concentration and neutralized with acetic acid. Then the neutralized product was drained and washed with additional 70% methanol, dehydrated with anhydrous methanol, and air-dried at 70° C. "Solution properties" were determined on a 1% aqueous solution. For each part of cellulose in all examples, there was used 0.60 part of monochloroacetic acid and 0.55 part of sodium hydroxide (based on 100% sodium hydroxide). The various ratios apply at the start of the reaction and therefore do not account for changes in water content or other materials during the reaction. However, the reaction mixture is in the form of a slurry throughout the reaction. "Parts water" in Table 1 includes the total amount of water present in the reaction mixture at the start of the reaction (except the approximately 5% by weight of water in the air-dry cellulose used) whether the water is added as such or included in the sodium hydroxide or other materials of the reaction mixture.

to 1½ hours at approximately room temperature. In addition the resulting alkali cellulose may or may not be aged for any desired period of time. Then the monochloroacetic acid or other etherifying agent is agitated into the alkali cellulose mixture and the final reaction mixture subjected to a temperature of 25° C.–150° C. for 1–6 hours (usually 50° C.–75° C. for 1½ to 2½ hours) while continuing to agitate throughout the reaction. The monochloroacetic acid may be added as a solid or in any other suitable form, e.g. dissolved in the diluent employed. The liquid is drained from the solid fibrous reaction product and the diluent is easily recovered for reuse. Ordinarily, the product is further processed as by purifying and dehydrating. This comprises, e.g., washing the product with a nonsolvent such as methanol, neutralizing the free alkali with acetic acid, draining off the liquid, washing the product again with anhydrous methanol, and finally air-drying the cellulose ether product.

The above examples clearly show the criticality of water to cellulose ratio, that the applicable range of this

TABLE 1

| Ex. No. | Type diluent | Parts diluent | Parts water | Parts cellulose | D.S. | Percent MCA efficiency | Solution properties | |
|---|---|---|---|---|---|---|---|---|
| | | | | | | | Turbidity | Fiber rating |
| 1A | n-Propyl alcohol | 1045 | 275 | 100 | 0.65 | 60.0 | Hazy | 3 |
| 1B | do | 1045 | 250 | 100 | 0.67 | 61.9 | Clear | 3 |
| 1C | do | 1045 | 200 | 100 | 0.74 | 68.4 | do | 2+ |
| 1D | do | 1045 | 175 | 100 | 0.78 | 72.1 | do | 3 |
| 1E | do | 1045 | 150 | 100 | 0.83 | 76.7 | do | 2+ |
| 1F | do | 1045 | 125 | 100 | 0.80 | 74.0 | Hazy | 4 |
| 1G | do | 1045 | 100 | 100 | 0.83 | 76.7 | Opaque | |
| 1H | do | 1045 | 50 | 100 | 0.37 | 34.2 | do | |
| 2A | Isobutyl alcohol | 1042 | 200 | 100 | 0.63 | 58.2 | Opaque | |
| 2B | do | 1042 | 150 | 100 | 0.74 | 68.4 | Hazy | 4 |
| 2C | do | 1042 | 125 | 100 | 0.81 | 74.8 | Clear | 3+ |
| 2D | do | 1042 | 120 | 100 | 0.78 | 72.1 | do | 4 |
| 2E | do | 1042 | 100 | 100 | 0.83 | 76.7 | do | 4 |
| 2F | do | 1042 | 80 | 100 | 0.83 | 76.7 | do | 4+ |
| 2G | do | 1042 | 75 | 100 | 0.85 | 78.5 | do | 4 |
| 2H | do | 1042 | 50 | 100 | 0.74 | 68.4 | Opaque | |
| 3A | Secondary butyl alcohol | 1050 | 200 | 100 | 0.38 | 35.1 | Opaque | |
| 3B | do | 1050 | 150 | 100 | 0.45 | 41.6 | do | |
| 3C | do | 1050 | 120 | 100 | 0.82 | 75.7 | V. v. hazy | 5+ |
| 3D | do | 1050 | 100 | 100 | 0.76 | 70.2 | V. hazy | 5+ |
| 3E | do | 1050 | 80 | 100 | 0.78 | 72.0 | V. v. hazy | 5+ |
| 3F | do | 1050 | 50 | 100 | 0.75 | 69.2 | Opaque | |
| 4A | Dioxane | 1,345 | 200 | 100 | 0.70 | 64.7 | Sl. haze | 5 |
| 4B | do | 1,345 | 175 | 100 | 0.69 | 63.7 | V. v. hazy | 5+ |
| 4C | do | 1,345 | 150 | 100 | 0.75 | 69.3 | Sl. haze | 5 |
| 4D | do | 1,345 | 125 | 100 | 0.76 | 70.2 | V. v. hazy | 5+ |
| 4E | do | 1,345 | 100 | 100 | 0.80 | 73.9 | do | 5+ |
| 4F | do | 1,345 | 50 | 100 | 0.83 | 76.7 | Opaque | |
| 5A | n-Butyl alcohol | 1,050 | 200 | 100 | 0.71 | 65.6 | V. hazy | 5+ |
| 5B | do | 1,050 | 80 | 100 | 0.89 | 82.2 | do | 5 |
| 5C | do | 1,050 | 60 | 100 | 0.74 | 68.4 | Opaque | |
| 6A | n-Amyl alcohol | 1,062 | 160 | 100 | 0.67 | 61.9 | Hazy | 3+ |
| 6B | do | 1,062 | 120 | 100 | 0.69 | 63.7 | Clear | 3+ |
| 6C | do | 1,062 | 80 | 100 | 0.79 | 73.0 | do | 3 |
| 6D | do | 1,062 | 60 | 100 | 0.86 | 79.5 | Hazy | 4 |
| 6E | do | 1,062 | 40 | 100 | 0.80 | 74.0 | Opaque | |
| 7A | Acetone | 995 | 170 | 100 | 0.72 | 66.4 | Hazy | 5+ |
| 7B | do | 995 | 140 | 100 | 0.74 | 68.3 | do | 5+ |
| 7C | do | 995 | 110 | 100 | 0.79 | 72.9 | V. v. hazy | 5+ |
| 7D | do | 995 | 100 | 100 | 0.83 | 76.5 | V. hazy | 5+ |
| 7E | do | 995 | 90 | 100 | 0.80 | 73.8 | V. v. hazy | 5+ |
| 7F | do | 995 | 70 | 100 | 0.83 | 76.5 | Opaque | |
| 7G | do | 995 | 60 | 100 | 0.83 | 76.5 | do | |
| 8A | Isopropyl alcohol | 1,135 | 160 | 100 | 0.78 | 72.1 | Clear | 3 |
| 8B | do | 1,135 | 100 | 100 | 0.81 | 74.9 | V. hazy | 5+ |
| 8C | do | 1,135 | 40 | 100 | 0.23 | 21.2 | Opaque | |

Although the order in which the cellulose, diluent, alkali and water are mixed is not important, a preferred order of preparing a charge is to place the diluent in a reactor, add the desired amount of water to sodium hydroxide and mix the resulting solution well with the diluent, then agitate cellulose into the diluent-sodium hydroxide-water mixture. The total time of preparing this mixture usually will vary over a period of about 10 minutes to 20 minutes. Following this, there may or may not be an alkali cellulose period which comprises continuing the agitation ordinarily from about ½ ratio varies considerably depending on the particular diluent employed, and the surprising nature of this finding in general. Thus, these examples show that by controlling the water to cellulose ratio within the critical limits disclosed, diluents heretofore thought to be inoperable can be emoplyed to obtain at least as good reaction efficiency in all caess (and in several cases at least as good product uniformity) as the art teaches for isopropyl alcohol and tertiary butyl alcohol. More specifically, the above examples show that n-propyl alcohol, isobutyl alcohol, and n-amyl alcohol give at least as good reaction efficiency and also product uniformity as do isopropyl alcohol and tertiary butyl alcohol of the prior art; and that n-propyl alcohol, n-butyl alcohol, isobutyl alcohol, secondary butyl alcohol, n-amyl alcohol, acetone, and dioxane all give at least as good reaction efficiency as do isopropyl alcohol and tertiary butyl alcohol of the prior art. These examples establish the following operable and preferred ratio ranges of water to cellulose for the diluents indicated.

Table 2

*Water/Cellulose Ratio*

| Diluent | Operable | Preferred |
|---|---|---|
| n-Propyl alcohol | 1.25–2.75/1 | 1.5/1 |
| Isobutyl alcohol | 0.75–1.5/1 | 0.8–1/1 |
| Secondary butyl alcohol | 0.8–1.2/1 | 0.8/1 |
| Dioxane | 1–2/1 | 1.5/1 |
| n-Butyl alcohol | 0.8–2/1 | 0.8/1 |
| n-Amyl alcohol | 0.6–1.6/1 | 0.8/1 |
| Acetone | 0.9–1.7/1 | 1/1 |
| Isopropyl alcohol | 1–1.6/1 | 1.6/1 |

As those skilled in this art will appreciate, the above critical water/cellulose ratio ranges will vary somewhat as the slurry concentration varies. For instance, the lower the slurry concentration the higher the water/cellulose ratio range, and conversely. Slurry concentration is determined by dividing the parts cellulose by the sum of the parts diluents and parts cellulose employed. Also, although not pronounced, the water/cellulose ratio range is affected somewhat by the alkali/cellulose ratio employed, as those skilled in this art will appreciate.

This invention is applicable to preparing any carboxyalkyl cellulose which is insoluble in the diluents employed. These include, e.g. carboxymethylcellulose, carboxypropyl cellulose, carboxybutyl cellulose, and variations thereof effected by substitution in the alkyl group. Since the reaction is carried out in the presence of a strong alkali, normally the final product is the alkali salt of the carboxyalkyl ether. However, the free acid form may be obtained by well-known means, e.g., by treating the salt with a mineral acid or an ion exchange resin process. Too, the free acid can be converted into various other salts, if desired.

While alkali metal hydroxides are preferred, especially sodium hydroxide, any of the strong alkali hydroxides are suitable. Any amount of alkali is operable short of rendering the cellulose ether product soluble in the spent reaction mixture. Usually the preferred amount of alkali (based on sodium hydroxide) is about 0.1–2.0 parts per part of cellulose.

Useful etherifying agents besides monochloroacetic acid include other halogenated lower fatty acids, e.g., chloropropionic acid, chlorobutyric acid and alkali metal salts thereof. The corresponding bromine and iodine compounds are also suitable but more expensive. Among other things, the D.S. desired will determine the amount of etherifying agent employed. Generally this will be about 0.01–3.0 parts of etherifying agent (based on monochloroacetic acid) per part of cellulose. Also, about 0.25–1.0 mole of etherifying agent per mole of free alkali is preferred (based on monochloroacetic acid and sodium hydroxide, respectively).

While chemically purified cotton linters, wood pulp and various other cellulosic materials are satisfactory for use in the process of this invention, the preferred ones are purified cotton linters and high α-cellulose wood pulp.

Outstanding advantages of the present invention are that it produces a far more flexible choice of diluents than heretofore thought possible from the standpoint of diluent losses during the process, cost, efficiency of recovery, and so forth. Many diluents heretofore found inoperable have been rendered by this invention at least as good as the prior art diluents. Still further advantages of some of the diluents of the present invention (e.g., dioxane, n-amyl alcohol, n-butyl alcohol, isobutyl alcohol and secondary butyl alcohol) are that their relatively high boiling points permit higher etherification reaction temperatures without having to resort to pressure equipment.

As many apparent and widely different embodiments of this invention may be made without departing from the spirit and scope thereof, it is to be understood that the invention is not limited to the specific embodiments thereof described herein except as defined in the appended claims.

What we claim and desire to protect by Letters Patent is:

1. The process of preparing carboxyalkyl ethers of cellulose which comprises agitating cellulose, free alkali, water and an etherifying agent selected from the group consisting of halogenated lower fatty acids and alkali metal salts thereof in a liquid diluent selected from the group consisting of those diluents tabulated hereinbelow, the ratio of water to cellulose being as shown in said tabulation, the resulting ether product remaining in a solid undissolved state in the reaction mixture until recovered, said cellulose being slurried in said diluent throughout the etherification:

| Diluent: | Water/cellulose ratio |
|---|---|
| n-Propyl alcohol | 1.25–2.75/1 |
| Isobutyl alcohol | 0.75–1.5/1 |
| Secondary butyl alcohol | 0.8–1.2/1 |
| Dioxane | 1–2/1 |
| n-Butyl alcohol | 0.8–2/1 |
| n-Amyl alcohol | 0.6–1.6/1 |
| Acetone | 0.9–1.7/1 |

2. The process of claim 1 wherein the diluent is n-propyl alcohol and the water to cellulose ratio is 1.25–2.75/1.

3. The process of claim 1 wherein the diluent is isobutyl alcohol and the water to cellulose ratio is 0.75–1.5/1.

4. The process of claim 1 wherein the diluent is n-amyl alcohol and the water to cellulose ratio is 0.6–1.6/1.

5. The process of claim 1 wherein the diluent is acetone and the water to cellulose ratio is 0.9–1.7/1.

6. The process of claim 1 wherein the diluent is n-butyl alcohol and the water to cellulose ratio is 0.8–2/1.

7. The process of claim 1 wherein the carboxyalkyl ether of cellulose is carboxymethylcellulose.

8. The process of preparing sodium carboxymethylcellulose which comprises agitating comminuted cellulose, free alkali, water and monochloroacetic acid in a liquid diluent selected from the group consisting of those diluents tabulated hereinbelow, the ratio of water to cellulose being as shown in said tabulation, subjecting the resulting mixture while continuing to agitate to a temperature of 25° C.–150° C. until the cellulose is etherified, the resulting ether product remaining in a solid undissolved state in the reaction mixture until recovered, and finally recovering said ether product, said cellulose being slurried in said diluent throughout the etherification.

| Diluent: | Water/cellulose ratio |
|---|---|
| n-Propyl alcohol | 1.25–2.75/1 |
| Isobutyl alcohol | 0.75–1.5/1 |
| Secondary butyl alcohol | 0.8–1.2/1 |
| Dioxane | 1–2/1 |
| n-Butyl alcohol | 0.8–2/1 |
| n-Amyl alcohol | 0.6–1.6/1 |
| Acetone | 0.9–1.7/1 |

References Cited in the file of this patent

UNITED STATES PATENTS

| 2,181,264 | Dreyfuss | Nov. 28, 1939 |
| 2,517,577 | Klug | Aug. 8, 1950 |
| 2,517,835 | Branan et al. | Aug. 8, 1950 |
| 2,636,879 | Branan et al. | Apr. 28, 1953 |